United States Patent

[11] 3,626,390

[72] Inventors Joseph J. Chang
Shelburne, Vt.;
Irving Tze Ho, Poughkeepsie, N.Y.;
Norbert G. Vogl, Jr., Essex, Vt.; Bevan P. F. Wu, Poughkeepsie, N.Y.

[21] Appl. No. 876,416
[22] Filed Nov. 13, 1969
[45] Patented Dec. 7, 1971
[73] Assignee International Business Machines Corporation
Armonk, N.Y.

[54] MINIMEMORY CELL WITH EPITAXIAL LAYER RESISTORS AND DIODE ISOLATION
6 Claims, 4 Drawing Figs.

[52] U.S. Cl. 340/173 FF, 307/238, 307/279, 340/173 R
[51] Int. Cl. G11c 11/40
[50] Field of Search 340/173 FF, 173; 317/235; 307/238, 292

[56] References Cited
UNITED STATES PATENTS

| | | | |
|---|---|---|---|
| 3,218,613 | 11/1965 | Gribble | 340/173 |
| 3,423,737 | 1/1969 | Harper | 307/292 |
| 3,427,598 | 2/1969 | Kubinec | 307/238 |
| 3,505,000 | 4/1970 | Wiedmann | 317/235 |

*Primary Examiner*—Terrell W. Fears
*Attorneys*—Hanifin and Jancin and Maurice H. Klitzman

ABSTRACT: A nondestructive read-integrated circuit memory cell consisting of a pair of cross coupled transistors. The junctions between the collectors of the transistors and the intrinsic epitaxial layer is utilized to provide isolation between the transistors. The transistors are formed by a triple-diffusion process wherein the collector region contacts a buried layer of opposite semiconductivity relative to the semiconductivity of the substrate structure. An epitaxial growth being of the same semiconductivity as the buried layer region is utilized as both a resistive material between the input and the buried layer and to form a diode gradient between the epitaxial region and the collector region of the transistors. The buried region forms a diode junction with the collector regions of the transistor to allow a bilevel operation of the memory cell.

PATENTED DEC 7 1971 3,626,390

INVENTORS
IRVING TZE HO
JOSEPH JUIFU CHANG
NORBERT GEORGE VOGL, JR.
BEVAN PEIG FENG WU

BY Maurice H. Klitzman

ATTORNEY

MINIMEMORY CELL WITH EPITAXIAL LAYER RESISTORS AND DIODE ISOLATION

BACKGROUND OF THE INVENTION

The present invention relates to a monolithic-integrated circuit memory cell. More particularly, it relates to an integrated circuit comprising a plurality of storage cells each having a pair of duel emitter transistors.

In the present state of the art, it is well known that a pair of transistors may be interconnected so as to form a nondestructive memory cell. An example of this type of arrangement is disclosed in U.S. Pat. No. 3,423,737, issued Jan. 21, 1969. This patent discloses a memory cell having a very fast access time comprising two transistors, each having collector and base directly cross coupled to each other.

In these types of memory cells, information is stored by switching one of the two transistors to its conducting state and the other to its nonconducting state. This condition is maintained until an unbalance is created across the cell sufficient to alter the conductivity of the transistors. Reading of information from the cell is performed by applying a potential differential across the collector to emitter of the cell and applying a potential to the emitters of each of the transistors. The cell which is conducting will exhibit a detectable current signal which is sensed by a sense amplifier.

It should be recognized that each of these cells represent a small portion of the integrated circuit chip. That is, an array of such cells are formed on a monolithic integrated circuit. One of the objectives, in the manufacture of such integrated circuit chips, is to decrease the size of each cell so as to increase the number of information bits that may be stored in the array. Due to the compactness of the semiconductor elements in the cells, it has been necessary in the prior art to isolate each of the transistors in the cell by means of encircling each with an isolation diffusion ring. This diffusion ring maintains the integrity of the information which is stored in the cell by eliminating the switching of a transistor to its opposite state due to spurious signal levels which it may encounter during a sense or write cycle. Therefore, since each transistor requires a diffusion ring, a reduction in the size of the cell is limited by this space requirement.

A further disadvantage with the present dual emitter storage cell is that a reduction in size of the cells increases the power dissipation requirements of the integrated circuit chip. Since an information bit is stored by means of a conducting transistor in each cell, as the number of cells increases, the heat dissipation requirements also increase. Therefore, in the prior art an increased density of cells on the chip requires some form of sophisticated cooling apparatus in order to dissipate heat from the chip.

A further disadvantage with the present memory cells is that it is difficult to limit the current which flows through the transistors in the cell because of the inability of designing a sufficient resistive path at the input of each transistor. That is, since the resistance normally found connecting the collector region of the transistors to the input power source is relatively small, a high current passes through each cell that is storing information. This continuous passage of current after a read or write cycle places further demands on the heat dissipation required for the circuit chip.

A further disadvantage with the present state of the art memory devices is that they are subject to errors during the transient state of either a read or write cycle. Normally, each cell exhibits a virtual capacitance from the collector to the substrate. This capacitance passes some of the transient current during the operation of the cell. However, most of the spurious signal levels appear at the collector regions of the respective transistors. Thus, the probability of having an erroneous bit stored by means of switching the conductivity of the transistors is possible. One of the ways that present circuits attempt to eliminate this problem is by operating the transistors at a higher current thereby raising the value of threshold signal that is necessary to switch the conductivity of the transistor. This higher current again produces an increase in power dissipation presenting the heating problems discussed above.

Therefore, it is an object of the present invention to provide an improved integrated circuit memory device.

It is a further object of the present invention to reduce the size of a monolithic-integrated circuit memory cell without increasing the heat dissipation of the monolithic structure that comprises an array of memory cells.

It is a further object of the present invention to reduce the number of isolation regions required in prior memory cell arrays.

It is a further object of the present invention to reduce the power dissipation required to maintain information during the steady state operation of a memory cell array by means of a high-impedance diode junction formed between the collector region and a region of opposite semiconductivity.

It is a further object of the present invention to isolate each of a pair of transistors in an integrated circuit memory all by a diode junction formed by an epitaxial layer of opposite semiconductivity to the collector region.

SUMMARY OF THE INVENTION

In the present invention a memory cell capable of being arranged in a two-dimensional array is provided in an integrated circuit structure. Each cell in the array consists of a pair of transistors in which the junction between the collectors and the intrinsic epitaxial layer is utilized to provide isolation between the transistors. The transistors are formed by a triple-diffusion process wherein the collector region contacts a buried layer of opposite semiconductivity in the substrate. An epitaxial growth is formed over the substrate being of the same semiconductivity as the buried layer region. Since the epitaxial region is of the same semiconductivity as the buried layer, it is utilized as a resistive material between the buried layer and the input terminal into the cell. The buried layer forms a diode junction with the triple-diffused transistor so as to present a high-impedance input to the cells. This allows for the reduction of driving current during the quiescent state of operation of the memory array.

Isolation of each of the transistors from each other is effected by means of the epitaxial region which is of a different semiconductivity than the collector regions of each of the transistors. Thus, a back-to-back diode is effectively formed between each of the transistors within the cell by means of the epitaxial region which separates the transistors.

By means of having an epitaxial region of a different semiconductivity, it is possible to reduce the size of the cell by eliminating an isolation ring around each of the transistors in the cell. The transistors in the cell are separated by a distance equivalent to the distance from the transistor to the outermost isolation ring which surrounds and isolates the entire cell from all other cells in the integrated circuit memory array.

Furthermore, the structure of the cell allows for improved transient operation due to the virtual capacitance which exists between the cathode of the diode or buried layer, and the substrate. This capacitance shunts the high-impulse transient signals so as to allow for a lower operating current in the cell during a read or write cycle. By this shunting capacitance, it is possible to not have the transient signals appear at the collectors of the transistors. Therefore, due to this reduction in noise at the transistor, the cell may be operated at a lower current level. Whereas, if the transient noise appeared at the collector regions, the actual information signal level would have to be increased to avoid a spurious switching of the conditions in the cell.

DESCRIPTION OF THE INVENTION

Figure 1:
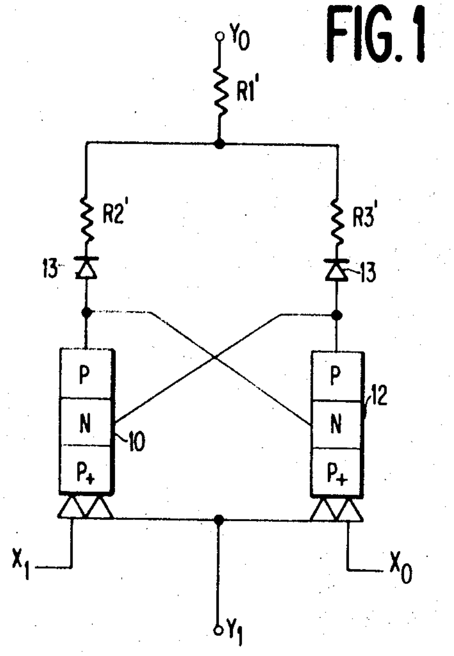
FIG. 1 is a schematic representation of a single cell of an integrated circuit memory array.

Referring to FIG. 1, there is shown a schematic representation of a single memory cell which is capable of storing one bit of information. For the purpose of simplicity, the invention will be shown and described as comprising a single cell of an integrated circuit structure. However, it is recognized by those skilled in the art that such a cell would not normally be manufactured as a separate entity, but an array of such cells would be arranged in a two-dimensional array so as to furnish a large scale integrated memory. For example, an integrated circuit memory array could consist of 150×150 cells which would cover an area of approximately 170 mils×170 mils.

As is seen by reference to FIG. 1, the storage cell has 4 terminals designated as $X_0$, $X_1$, $Y_0$ and $Y_1$. The X and Y designations represent the two coordinates of a memory array and all references hereafter to the coordinates will be designated as such. The interarrangement of cells is well known by those skilled in the art and is disclosed in the above-referenced patent.

All of the X and Y terminals would be connected in their respective dimensions by means of lines going through the integrated circuit structure. The $Y_0$ and $Y_1$ terminals provide inputs to the cells from the drivers which would power the cells during a read or write cycle and maintain the storage of information in the cell during its quiescent state. The $X_0$ and $X_1$ lines provide inputs to a pair of cross coupled transistors 10 and 12 which are operated in a grounded base configuration. The $X_0$ and $X_1$ terminals are connected to sense lines which terminate in sense amplifiers (not shown). In order to sense the bit designation that is stored at a particular cell, the sense amplifiers will detect variations in current through the $X_0$ or $X_1$ lines depending on whether a 0 or a 1 information is stored in the respective cell. The state that is detected at the sense amplifier is then transmitted by means of a decoder network (not shown) to an information processing unit that utilizes the data.

In the normal operation of a memory array, the cell as shown in FIG. 1 is addressed by placing a potential across all of the $Y_0$ terminals of the cells in a particular word. This effectively addresses all of the bits in the word. In conjunction with the addressing of the bits by $Y_0$, it is also possible to apply a signal to the $Y_1$ terminals of that word so as to control or change the potential differential across the cells. If the pair of transistors 10 and 12 are in a state in which transistor 10 is conducting, and transistor 12 is in an off condition, the cell is considered to have a 1 information bit stored. Since transistor 10 is in an on condition, it is conducting current from $Y_1$ to $Y_0$ continuously. In its conducting state, the collector of transistor 10 is at a potential of approximately 0.2 volts relative to $Y_1$. The base of transistor 10 is at approximately 0.8 volts. The collector voltage of transistor 10 holds transistor 12 in an off condition since the base voltage of the transistor cannot rise above 0.2 volts. If one the other hand transistor 10 was in an off condition and transistor 12 was conducting, the similar potentials would appear at the respective regions of transistor 12.

The memory cell shown in FIG. 1 is a nondestructive read/write cell. That is, information may be read from the cell without destroying the contents that is stored within. For the purpose of understanding the read/write cycle, reference should be made to FIG. 1 in conjunction with the signal diagram shown in FIG. 4. A read operation of the cell occurs between times $t_0$ and $t_1$. Assuming as discussed above, that transistor 10 is in a conducting condition and transistor 12 is in an off condition thus indicating that the cell in FIG. 1 has a 1 bit stored within, reading of this information is accomplished by applying an addressing signal at $Y_0$ beginning at time $t_0$. If it is desired to change the potential level that $Y_0$ must be raised to, the potential at $Y_1$ which is normally at ground may be set to any desired value. During the quiescent or steady state condition of the cell, normal current passing through transistor 10 would be in the range of 10 microamps. Then, during a read or sense operation the potential differential between $Y_0$ and $Y_1$ causes a current in the range of 300 microamps to pass through both transistors. As discussed previously, the potential signal at $Y_0$ addresses all the bits in a particular word. Therefore, in order to sense the information that is stored in the cell an information signal must be detected on the sense line by sense amplifiers (not shown). This is indicated by the dashed signal $X_1$ occurring during the time $t_0$ to $t_1$. Since transistor 10 is in a conducting state, a current signal will be sensed on the sense amplifiers which would be connected at the termination of the line that interconnects the $X_1$ terminals. This would indicate that a 1 bit information is stored in the cell and this in turn would be communicated to the utilization equipment by means of decoders (not shown).

Figure 4:
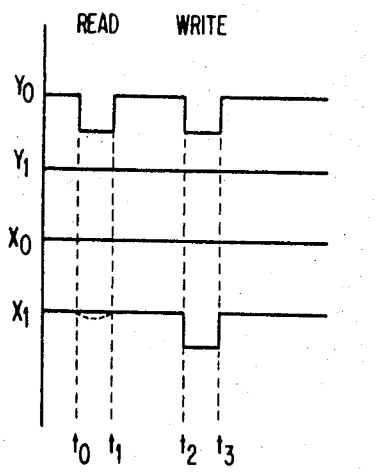
FIG. 4 is a timing diagram showing the signal levels during a read and write operation of the memory cell.

During a write operation, the same addressing signal must be presented on the $Y_0$ line as during a read operation as shown by the signal level in FIG. 4 during time $t_2$ to $t_3$. Assuming that it is desired to write a 0 information bit into the cell, a negative pulse must be applied to the X line while a ground or small signal level is maintained at the $X_0$ line. By placing the emitter of transistor 12 at a ground level and having the collector of transistor 10 rise until the base of transistor 12 starts drawing current, the cells are forced to switch state. When transistor 12 is conducting enough current the collector of the transistor is pulled down thereby cutting off and holding transistor 10 in an off condition. Then, when the word selection line signal at $Y_0$ is returned to its quiescent state this condition of the cell is maintained. Thus, the current which was originally flowing in transistor 10 has been transferred completely to transistor 12 and the state of the cell is reversed. If it is desired to reverse the condition back and make transistor 10 conducting, an application of a negative potential signal at $X_1$ and a maintaining of $X_0$ at ground potential would achieve this in a similar manner as discussed above.

Since these cells would normally be arranged in an XY array, it should be understood that the address line would operate am entire would along the Y dimension and selective ones of the X dimension line would be activated so as to sense or write information in the X word.

Figure 2:
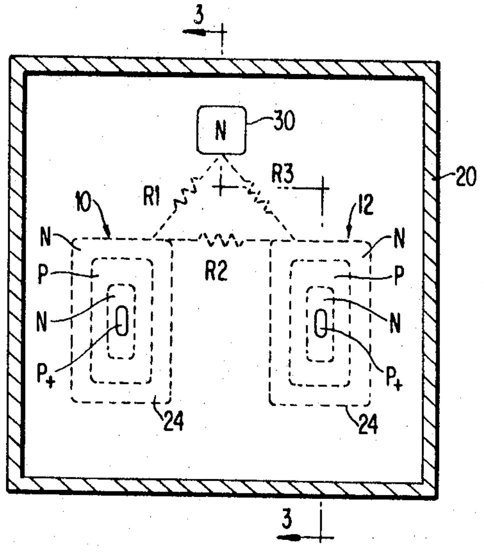
FIG. 2 is a top view of a single memory cell formed as an integrated circuit on a single substrate.
Figure 3:
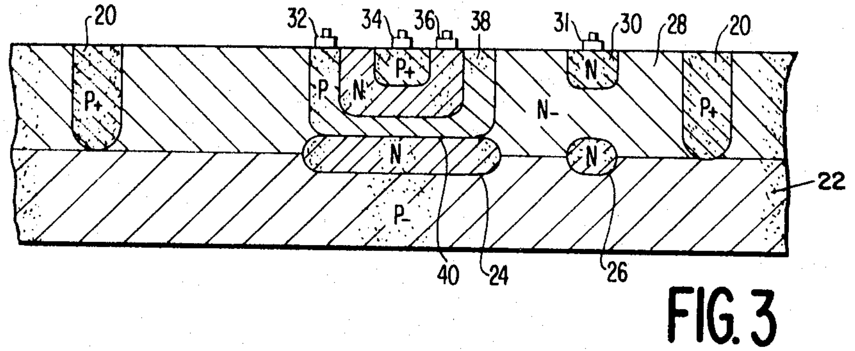
FIG. 3 is a cross-sectional view of a portion of the single cell structure of FIG. 2.

Referring now to FIGS. 2 and 3, there is shown a cross-sectional view of one cell in the memory array which is formed in a single chip structure. The cell consists of transistors 10 and 12 surrounded by an isolation region 20 which isolates the cell from the remaining cells in the XY array.

In considering the cell structure, it is seen that by using an epitaxial region 28 of the same semiconductivity as the buried island cathode 24 of the diodes 13, the epitaxial region may be used as a resistance from the input terminals 30 to $Y_0$ to the cathode of the diode 13. Specifically, by looking at FIG. 2 there would effectively be resistances interconnecting input region 30 to the diffused regions 24. These resistances would effectively have the appearance of a delta resistor network. This resistance network may be represented by values R1, R2 and R3. This type of resistor network may also be represented by its well-known wye equivalent. Thus, the equivalent wye structure of the form R1', R2' and R3' would have values as follows:

$$R1' = \frac{R1 \times R3}{R1 + R2 + R3} \qquad R2' = \frac{R1 \times R2}{R1 + R2 + R3}$$

$$R3' = \frac{R3 \times R2}{R1 + R2 + R3}$$

The values of R1, R2 and R3 may be controlled by particular doping of the epitaxial region 28. Furthermore, another method of adjusting the input resistances is provided by the control region 26 which effectively acts as a shunt resistance across the epitaxial resistance. Since the positioning and size of the diffused control region is more easily controlled than positioning of the input region 30 relative to buried layer 24, good precision may be obtained through this technique. By particularly choosing the R1, R2 and R3 resistances during the manufacturing process, the input resistances to the transistors R1', R2', and R3' may be chosen.

Further isolation is achieved between the transistors within the cell by the fact that the epitaxial region 28 is of a different semiconductivity than the collector region 38 of the transistors. As seen from the cross section in FIG. 3, the collector region 38 forms a diode with the buried island region across interface 40 and there would also appear to be a diode gradient across the remaining interface of the collector region with the epitaxial region. Thus, there is a diode formed which is represented by diode 13 in FIG. 1 at the input of each of the transistors and also, there is a diode formed between the collectors of the two transistors (not shown in the diagram). This second diode effectively isolates each of the transistors within the cell and allows for the transistors to be placed in closer proximity to each other by the elimination of the isolation ring around each semiconductor device as needed in prior memory cells.

It is well known that in memory cells of this type there is usually a capacitance formed between the collector region and the substrate of a semiconductor device. Since the structure of the invention utilizes a buried island as the cathode of an input isolation diode 13, this effectively moves this virtual capacitance from the collector region to the cathode of the diode 13. By means of this shift of the capacitance, it is possible to reduce transient errors. Transient pulses will be passed through the capacitance without affecting the passage of current through either transistor 10 or 12 thus eliminating the possibility of a transient pulse switching the state of the cell and causing an erroneous bit to be written into one of the cells.

As discussed previously, the cells of this invention are bilevel operational. By this it is meant that the cells have two current levels at which they operate. A first level at which the cells are maintained in their quiescent state, and a second level of current which is impressed upon the cells during a sense or write operation. In actual practice the differential in current is 30—1 for the particular disclosed embodiment. By this reduction in current during the steady state operation of the memory array, it is possible to reduce the cell size and increase density on an integrated circuit chip without presenting heating problems.

Referring now to FIG. 3, the integrated circuit is formed in a silicon body 22 having a first type of semiconductivity designated as $P^-$. In this body material, in order to form the cathodes for the diodes 13 a hole is cut into the surface layer of the body material in those areas where the transistors are to be formed. This hole is indicated by the buried island region 24 which is of a second type of semiconductivity designated as N. At the same time that the buried island hole is cut, another hole is cut between the isolation region and each of the transistors. This hole is for the purpose of forming a controlled diffusion region for better design of the resistance on the input of the cell. This control region 26 is also of a second type of semiconductivity designated as N. The next process step in forming the cell is to form the buried island and the control resistance region by means of diffusion into the regions cut into the substrate. Then, after diffusion, an epitaxial region slightly doped $N^-$ is grown over the entire substrate. This region is designated as 28. It is significant to note that the epitaxial region is of the same type of semiconductivity as the buried island region. This provides for the use of the epitaxial region as a resistive region connecting to the cathode 24 of diodes 13. The epitaxial region is a good resistance path to the cathode of the diode 13 which will be formed between the buried island 40 and the collector 38 of the transistors in the cell. Each cell has two transistors formed over two buried island regions 24. FIG. 3 shows a cross section of one of these transistors, but it should be noted that an identical structure would exist at the other transistor.

After the epitaxial region is grown, an isolation ring is then diffused about the circumference of the cell. Each of the transistors in the cell is formed by a triple-diffusion process which would selectively form a collector region of a first type of semiconductivity P, a base region of a second type of semiconductivity N and an emitter region of a first type of semiconductivity $P^+$.

In order to provide an input region to which a contact terminal for the $Y_0$ address line, it is necessary to diffuse an N region 30 at an equidistant point from both transistors in the cell. After all of the diffusion steps and the semiconductive regions are properly formed in the substrate, ohmic contacts are formed on those terminals that are to make electrical connectors with the semiconductors in the substrate. Contact 31 serves as the $Y_0$ input, contact 32 provides the terminal for the collector-to-base connection between the transistors in the cell, contact 34 is formed as a dual emitter connection for the X line and the ground connection $Y_1$ and contact 36 provides the base connection to the N base region of each of the transistors. In order to minimize interference and facilitate the base-to-collector interconnection of the transistors, it is possible to grow an underpass $P^+$ region between the cells. This has not been shown in the diagram for the purpose of simplicity. Such underpass diffusion regions are commonly known in the art and may be utilized if desired.

In order to improve isolation of the cells in the array, it is also well known in the art to place a negative potential at the $P^+$ isolation region 20. This has not been shown in the diagram for the purpose of simplicity, and it would not add to the teaching of the invention.

It should be noted that the practice of the invention is not limited to the particular semiconductive materials used in the disclosed embodiment since it is possible to practice the invention by using either PNP- or NPN-transistors in the cell.

It should further be noted that the practice of the invention is not limited to a cross-coupled transistor memory cell. The invention may be utilized in any integrated circuit structure whereby it is possible to reduce the size of the circuit by utilizing the epitaxial layer as the resistive path between the active elements in the circuit and also to provide effective isolation between the elements in the circuit which are interconnected.

While the invention has been particularly shown and described with reference to the preferred embodiment thereof, it will be understood by those skilled in the art that various changes in form and details may be made therein without departing from the spirit and scope of the invention.

What is claimed is:

1. A nondestructive read storage device capable of maintaining a signal representative of digital information comprising:

a body of semiconductive material of a first type of semiconductivity.

a first and second buried island region of a second type of semiconductivity formed in said body material so as to form the cathodes of a first and second diode junction;

a first and second triple-diffused transistor formed over said first and second buried regions respectively so as to form two diode junctions at the collectors of said transistors;

an epitaxial region of semiconductivity of the second type formed over said body material and surrounding said transistors so as to form a common electrode pair of diodes that separate the collectors of said first and second transistor;

said first and second triple-diffused transistors being interconnected between their base region and their collector regions respectively;

wherein information is stored in the cell by rendering one of the triple-diffused transistors in its conductive state while the second triple-diffused transistor is rendered in its off condition.

2. The storage device as defined in claim 1 further comprising a first control region of a semiconductive material of a second type of semiconductivity being equidistant from said buried island regions.

3. A memory storage device as defined in claim 2 further comprising a first and second control terminal connected to said first and second transistors respectively for determining the state of the transistors during a sense operation time period.

4. At integrated circuit storage device having an array of memory cells capable of accepting, maintaining and outputing digital information wherein each cell comprises:

a first transistor having a first collector, a first base and a first emitter region capable of operating in either an on state or an off state;

a second transistor having a second collector, a second base, and a second emitter region;

a first and a second diode junction formed between a first and second electrode region and said first and second collectors respectively;

said transistors having two interconnections between said first and second base and said collector regions;

an address input terminal connected to said first and second diodes by means of a resistive epitaxial region;

first and second sense terminals connected respectively to said first and second transistor for detecting the state of the transistor when it is addressed by the presence of a potential at said input terminal;

a further connection between said first and second emitter regions;

whereby bits of information are stored in said cells by placing one of said first or second transistors to its on state.

5. The integrated circuit as defined in claim 4 wherein said first and second diode junctions are formed by a buried island region in contact with the respective collector regions.

6. The integrated circuit as defined in claim 5 wherein said resistive epitaxial region separating said first and second transistors is of a same semiconductivity as said buried island region.

* * * * *